United States Patent [19]

Knight et al.

[11] Patent Number: 4,901,700
[45] Date of Patent: Feb. 20, 1990

[54] CLAMP FOR AN INTERNAL COMBUSTION ENGINE FUEL INJECTOR

[75] Inventors: Michael Knight; Ronald G. Moore, both of Peterborough, United Kingdom

[73] Assignee: Perkins Engines Group Limited, London, England

[21] Appl. No.: 638,449

[22] PCT Filed: Nov. 25, 1983

[86] PCT No.: PCT/GB83/00302
§ 371 Date: Jul. 19, 1984
§ 102(e) Date: Jul. 19, 1984

[87] PCT Pub. No.: WO84/02161
PCT Pub. Date: Jun. 7, 1984

[30] Foreign Application Priority Data

Nov. 27, 1982 [GB] United Kingdom ............... 8233873

[51] Int. Cl.⁴ .................. F02M 61/14; F16B 21/10
[52] U.S. Cl. ................................................ 123/470
[58] Field of Search ..................... 123/470, 471, 472

[56] References Cited

U.S. PATENT DOCUMENTS 4,133,321 1/1979 Hofmann et al. ............... 123/470
4,246,877 1/1981 Kennedy ............................. 123/470

FOREIGN PATENT DOCUMENTS 329325   5/1976  Austria .
2109727  3/1971  Fed. Rep. of Germany ...... 123/470
3010328  9/1981  Fed. Rep. of Germany ...... 123/470
875438   8/1961  United Kingdom ............... 123/470
1549740  8/1979  United Kingdom ............... 123/470

Primary Examiner—Tony M. Argenbright

[57] ABSTRACT

A fuel injector clamp takes the form of a generally oval-shaped ring manufactured from pipe so that the side walls on the minor axis enclose flats on opposite sides of the injector body and the end walls on the major axis each encircle a respective fixing bolt. The end walls encircle more than 180 degrees of the circumference of the bolt. The side walls adjacent each end are pinched inwards towards one another, but are not fully brought together. Encirclement of the fixing bolts in this way serves to increase the contact area between the botls and clamp to ensure improved clamping, and also produces an inherent resistance to spreading of hte side walls. The lower edges of the side walls are each formed with a pair of indentation so that the portion therebetween is arcuate and forms a point contact with a respective bearing shoulder on the injector body. These identations are formed by deformation of the edges of the side wall so as to avoid machining. Thus a tiltable clamp can be provided in a simple manner from a uniform width of pipe without involving any material waste.

8 Claims, 1 Drawing Sheet

CLAMP FOR AN INTERNAL COMBUSTION ENGINE FUEL INJECTOR

TECHNICAL FIELD

This invention relates to clamps for fastening fuel injectors to the cylinder heads of internal combustion engines.

Fuel injector clamps are proposed in British Patent No. 1549740 comprising a short length of pipe that is deformed into an oval shape so that the side walls on the minor axis of the clamp enclose flats on opposite sides of the injector body and engage bearing shoulders adjacent these flats. Two fixing bolts are inserted through the oval one at each end so as to engage the respective end portion of the clamp, thereby to fasten the injector in place in the correct orientation as determined by the flats. Further, in order to accommodate uneven tightening of the two bolts, the lower edges of the side walls of the clamp are inclined downwards from the ends towards the minor axis so as to form a point of contact with the bearing shoulders about which the clamp can tilt during tightening.

The manufacture of fuel injector clamps from pipe stock offers a substantial reduction in production costs as compared with the conventional manufacturing techniques involving forging or pressing steel plate. However, the proposed design suffers from potential weaknesses that may lead to loosening of the clamp or spreading apart of the side walls and consequent failure of the fastening. An object of the present invention is to provide an improved design that reduces or overcomes these disadvantages.

DISCLOSURE OF THE INVENTION

According to one aspect, the invention consists in a fuel injector clamp in the form of a generally oval-shaped ring manufactured from pipe so that the side walls on the minor axis enclose flats on opposite sides of the injector body and the end walls on the major axis each encircle a respective fixing bolt over more than 180 degrees of the circumference of the bolt. Preferably, the side walls adjacent each end are pinched inwards towards one another, but are not fully brought together. Encirclement of the fixing bolts in this way serves to increase the contact area between the bolts and clamp to ensure improved clamping, and also produces an inherent resistance to spreading of the side walls.

According to another aspect, the invention consists in a fuel injector clamp in the form of a generally oval-shaped ring manufactured from pipe so that the side walls on the minor axis enclose flats on opposite sides of the injector body and the end walls on the major axis each surround a respective bolt, the lower edges of the side walls each being formed with a pair of indentations so that the portion therebetween is arcuate and forms a point of contact with a respective bearing shoulder on the injector body. Preferably, these indentations are formed by deformation of the edges of the side wall so as to avoid machining. Thus a tiltable clamp can be provided in a simple manner from a uniform width of pipe without involving any material waste such as would occur in forming inclined edges or projections on the lower edges of the side walls.

The invention will now be described by way of example with reference to the accompanying drawings in which,

BEST MODE OF CARRYING OUT THE INVENTION

Figure 1:
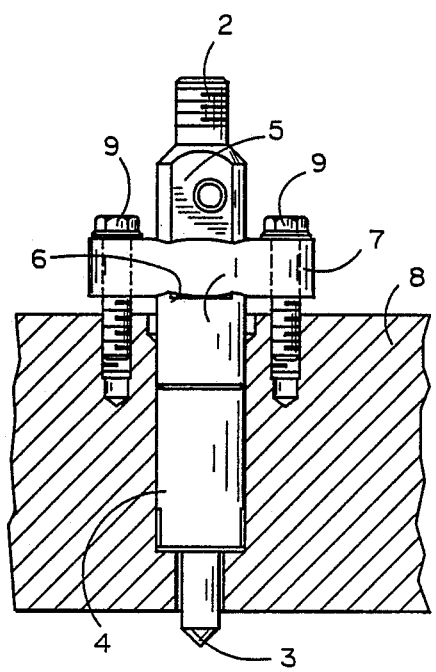
FIG. 1 is an axial section of a clamp according to the invention used to secure a fuel injector in place on the cylinder head of a diesel engine.

The fuel injector shown in FIG. 1 comprises an injector body 1 having an upper end provided with a fuel connector 2 and a lower end to which a fuel nozzle 3 is secured by means of a nut 4. A pair of parallel flats 5 are formed on the side of the body 1 and terminate in bearing shoulders 6 at their lower ends. A clamp 7 engages the flats 5 and bearing shoulders 6 and is secured to the engine cylinder head 8 by a pair of bolts 9 to clamp the injector in place in the cylinder head 8.

Figure 3:
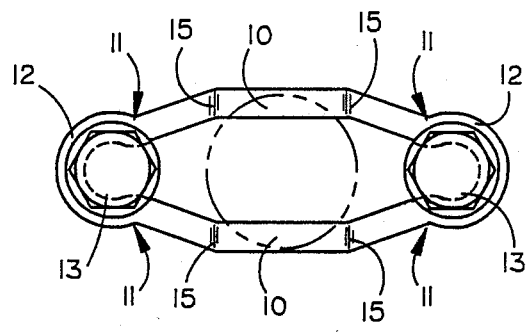
FIG. 3 is a plan view of the clamp of FIGS. 1 and 2.

The clamp 7 is made from a short length of pipe that is flattened into a substantially oval shape so as to produce parallel side walls 10 on the minor axis A—A (FIG. 3) that are spaced apart enough to engage the flats 5 on the injector body and thereby orientate the injector at the required angular setting in the cylinder head. The side walls 10 adjacent each end are further pinched inwards towards one another at 11 so that the end walls 12 along the major axis B—B each encircle more than 180 degrees, thereby forming a partially closed pocket 13 to receive the shank of a bolt 9. The head of each bolt engages the whole of the upper edge of the end wall 12 as shown in FIG. 3 and thus clamps it in position more securely than would be the case if the pinches 11 were absent. Also, the pinches 11 increase the inherent strength of the clamp and resist any tendency for the side walls 11 to spread apart under load. The pockets 13 also hold the bolts 9 captive and guide them conveniently into place during assembly.

The upper and lower edges of the clamp are parallel, but a point contact is produced between the lower edge of the clamp and each flat bearing shoulder 6 by forming an arcuate bearing surface 14 in the lower edges of the clamp along the minor axis A—A.

Each arcuate bearing surface 14 is formed between a pair of indentations 15 spaced apart by substantially the same width as the shoulder 6 or by slightly more than this width, so that tilting of the clamp end-to-end within the normally expected angular range will not cause the lower edge of the clamp to engage the edges of the shoulder 6. Instead, the arcuate bearing surface 14 rolls on the shoulder 6 during tilting, the curvature of the surface 14 being selected in relation to the clearances and tolerances between the bolts and clamps. A point contact is thereby maintained that exerts a constant downwards load.

Both the upper and lower edges of the clamp are formed with the arcuate bearing surfaces 14 so that the clamp is reversible for convenience in use.

Figure 2:
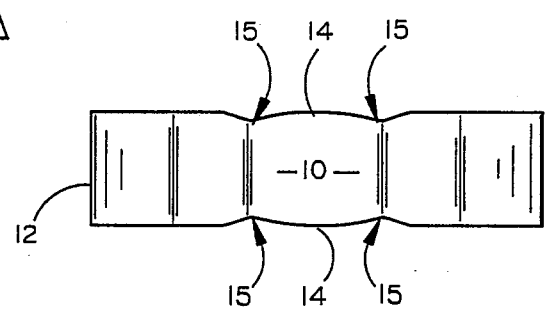
FIG. 2 is a side view of the clamp of FIG. 1.

It will be appreciated that the clamp of FIGS. 1 to 3 can be relatively easily and thus inexpensively, manufactured from pipe stock and requires only a few operations comprising shearing a short length from the pipe stock; pinching the side walls, if this has not already been done on the original pipe stock; and forming the indentations, preferably by an upsetting operation. All material wastage can be avoided by this manufacturing process.

Figure 4:
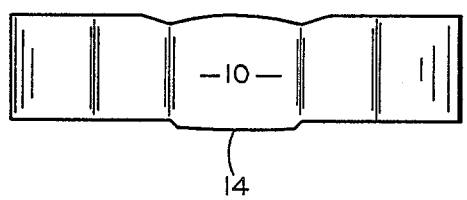
FIG. 4 is a side view of an alternative clamp according to the invention.

FIG. 4 illustrates an alternative clamp which differs from that of FIGS. 1 to 3 in the form of the arcuate bearing surface 14, in that this is provided as a projection from the lower edge so as to accomodate injectors in which the bearing shoulder 6 is lower than that shown in FIG. 1. This result can be achieved by machining the lower edge of the clamp of FIGS. 1 to 3 either side of the arcuate bearing surface 14.

We claim:

1. A fuel injector clamp adapted to be secured by a pair of fixing bolts to a head of an engine so as to hold a fuel injector in place by enclosing flats on opposite sides of a body of an injector and engaging bearing shoulders alongside each flat, said clamp being in the form of a generally oval-shaped ring manufactured from pipe having a longitudinal axis and major and minor axes lying in a plane perpendicular to said longitudinal axis, the ring having side walls on the minor axis adapted to enclose flats on opposite sides of the injector body, a lower edge adapted to engage a bearing shoulder on the injector body alongside each flat, and end walls on the major axis each adapted to surround a respective fixing bolt and extend around the circumference of a circle over more than 180 degrees.

2. A clamp as claimed in claim 1 in which the side walls (10) adjacent each end wall are pinched inwards towards one another (at 11).

3. A clamp as claimed in claim 2 in which the side walls (10) pinched inwards are not fully brought together.

4. A clamp as claimed in claim 1 in which the lower edge lies in a plane perpendicular to said longitudinal axis and has a portion along each side wall formed with a pair of indentations so that the edge between said indentations is arcuate and touches said plane thereby to form a point contact with a respective bearing shoulder on the injector body.

5. A clamp as claimed in claim 4 in which said indentations (15) are formed by deformation of said lower edge along each side wall.

6. A fuel injector clamp adapted to be secured by a pair of fixing bolts to a head of an engine so as to hold a fuel injector in place by enclosing flats on opposite side of a body of an injector and engaging bearing shoulders alongside each flat, said clamp being in the form of a generally oval-shaped ring manufactured from pipe having a longitudinal axis and major and minor axes lying in a plane perpendicular to said longitudinal axis, the ring having side walls on the minor axis adapted to enclose flats on opposite sides of the injector body, end walls of the major axis each adapted to surround a respective fixing bolt, and a lower edge adapted to engage a bearing shoulder on the injector body alongside each flat, the lower edge lying in a plane perpendicular to said longitudinal axis and having a portion along each side wall formed with a pair of indentations so that the edge between said indentations is arcuate and touches said plane, thereby to form a point contact with a respective bearing shoulder on the injector body.

7. A clamp as claimed in claim 6 in which said indentations (15) are formed by deformation said lower edge along each side wall.

8. A clamp as claimed in claim 6 in which the pipe has an upper edge and a lower edge lying in parallel planes and each formed with similar indentations so that the clamp is reversible on the injector body.

* * * * *